Dec. 30, 1941.   R. M. GARDNER   2,267,727
APPARATUS FOR BAKING FLUORESCENT LAMP TUBING AND THE LIKE
Filed Jan. 27, 1940   3 Sheets-Sheet 1

ROLAND M. GARDNER,
INVENTOR.

BY Laurence Burns,
ATTORNEY.

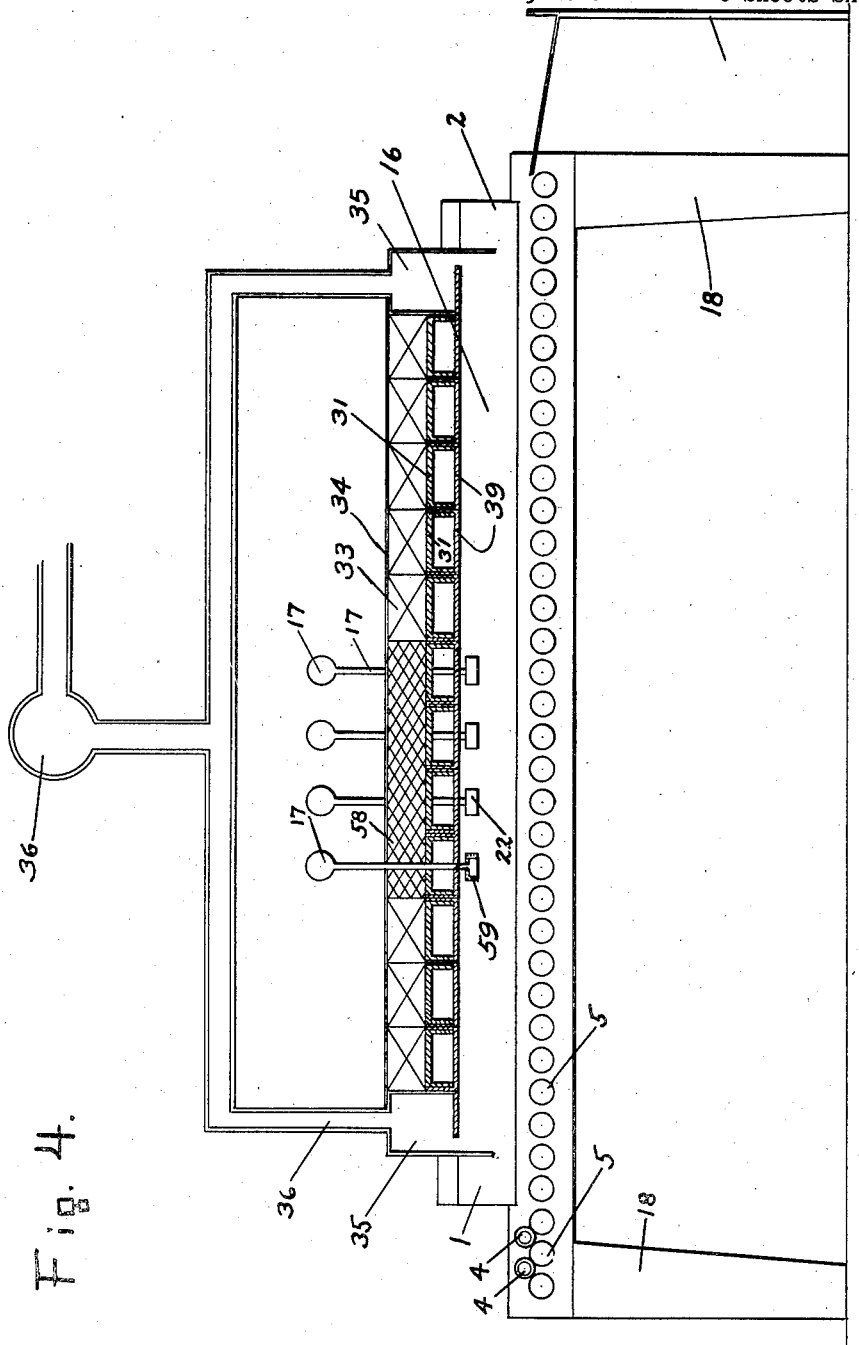

Dec. 30, 1941.                R. M. GARDNER                  2,267,727
           APPARATUS FOR BAKING FLUORESCENT LAMP TUBING AND THE LIKE
                    Filed Jan. 27, 1940           3 Sheets-Sheet 3
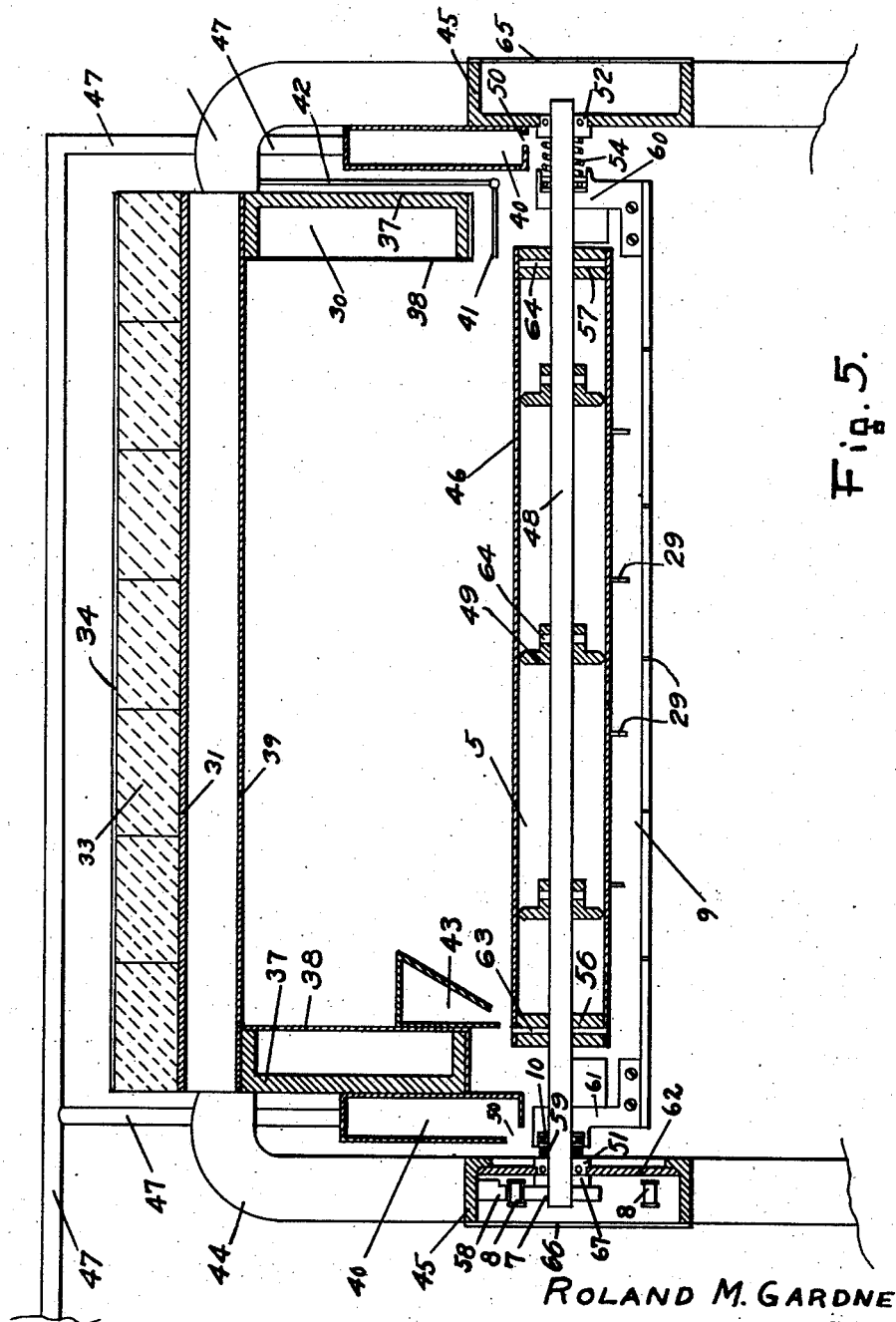
ROLAND M. GARDNER,
INVENTOR.
BY Lawrence Burns,
ATTORNEY.

Patented Dec. 30, 1941

2,267,727

UNITED STATES PATENT OFFICE 2,267,727

APPARATUS FOR BAKING FLUORESCENT LAMP TUBING AND THE LIKE

Roland M. Gardner, Swampscott, Mass., assignor to Hygrade Sylvania Corporation, a corporation of Massachusetts Application January 27, 1940, Serial No. 316,022

8 Claims. (Cl. 263—6)

The present invention relates particularly to machines and processes for the manufacture of internally-coated tubing, such as luminescent-coated glass tubing, but many features of the invention are suitable for use in the allied arts.

Luminescent-coated tubing is usually prepared by applying, to the interior of a tube of glass or the like, a suspension of luminescent material in a vehicle containing some viscous substance such as nitrocellulose, baking the tube until the binder decomposes to a dark residue of carbon or the like, and continuing the baking, in the presence of some oxygen, to remove the residue, leaving a coating of the luminescent material.

An object of the present invention is to provide a machine which will automatically bake such tubing uniformly in a manner suitable for factory production of the tubing for use in lamps.

A feature of the invention is an oven employing down-draft burners; and another feature is the arrangement of a considerable number of such burners in staggered relationship. A further feature is a series of rollers to carry the coated tube through the oven; and a pushing device for propelling the tube from roller to roller. Yet another is the arrangement of said rollers to permit expansion; and still another is an air draft through the baking tubes to facilitate removal of the carbon. Still another is an arrangement of channel iron and steel sheet to form the walls of such an oven.

Other objects, features and advantages of the invention will be apparent from the following description taken in connection with the accompanying drawings, in which:

Fig. 4 is an enlarged longitudinal section of the device of Fig. 1, taken on the side opposite Fig. 1, and with a ventilation system added; and Fig. 5 is a section transverse to that of Fig. 4, showing the interior of one of the rollers.

Figure 1:
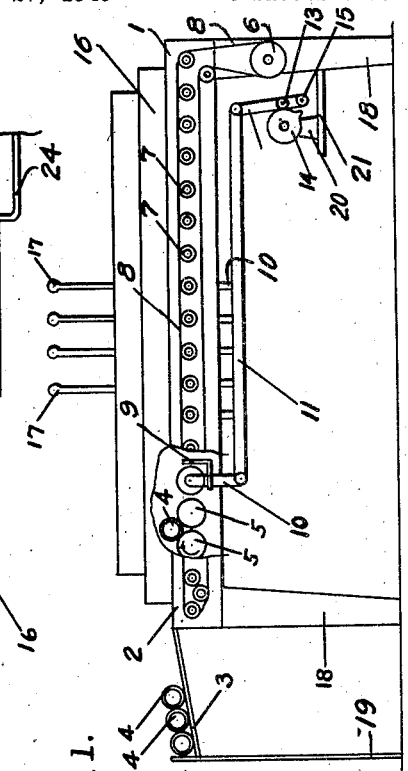
Fig. 1 is a longitudinal view, partly in section of a device according to the invention.

In Fig. 1, the tubes to be baked are placed into the end 1, of the machine, are baked and emerge at the end 2, of the machine, onto the inclined table 3. Inside the machine the coated tubes, such as tube 4, shown in the sectional part of Fig. 1, rest between the rollers 5, which are spaced apart but are close enough together to prevent the tube 4, from falling through the space between them. The rollers 5, are kept in rotation by the motor 6, which turns the sprockets 7, by means of the continuous chain 8. One sprocket is attached to each roller. The tube 4, is pushed from roller to roller by the pushing fork 9; the tube progressing through the machine from end 1, to end 2, with the rollers 5, rotating in the direction shown by the arrow, so that the top of the roller is moving in a direction opposite to the direction in which the tube 4, progresses through the machine. The rotation of the tubes 4, insures uniform heating around their circumferences.

A fork 9, is set along the rollers 5, in the space between rollers. The fork 9, is attached to the arm 10, which in turn is attached to the longer arm 11, which is itself attached to a short arm 12, bearing the follower 13, actuated by cam 14; the arm 12 being pivoted on a bearing 15. The cam 14 is kept rotating; it may be operated if desired from the motor 6, through a reduction gear if necessary, so that the tube 4 may revolve several times in each position before being pushed into the next position. For clarity, only one fork 9, is shown; actually one is used between each two rollers.

The oven 16 encloses the space above the roller 5, in which the tube 4 progresses through the machine. The oven 16 is heated by burners, shown in Figs. 2 and 4, attached to the supply pipe 17. The machine may be supported by legs 18, and the table by legs 19. The cam 14 may be supported by the piece 20, held on a shelf 21, or in some other convenient manner.

Figure 2:
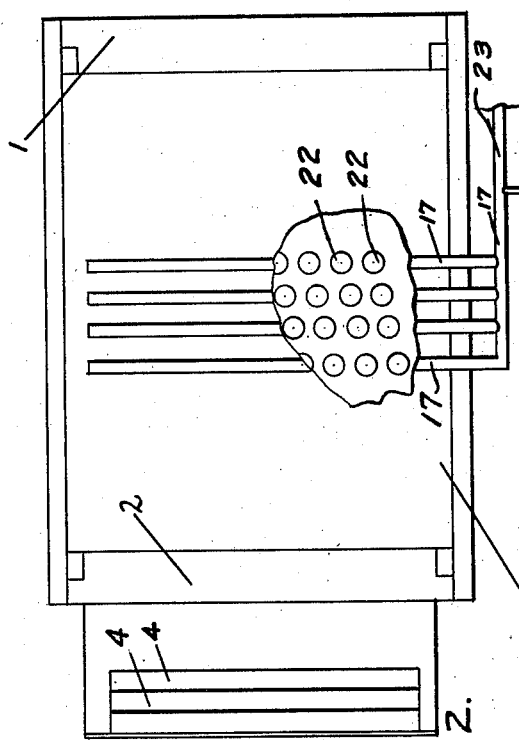
Fig. 2 is a top view of the same device.

In Fig. 2, the tubes 4, are shown on the table 3, after emerging from the oven 16. The burners 22, which are ceramic cups, are shown at the ends of the supply lines 17, which are fed by the gas and air lines, 23 and 24, respectively. The burners, shown in more detail in Fig. 4, are of course used to heat the oven 16. They are placed in a staggered formation, as shown by the section in the middle of Fig. 2, in order to insure uniform heating of the tubes 4, as they pass under them. The burners are arranged so that no two of them center on the same longitudinal line. This insures, that as a tube 4, passes through the oven, there will be no excessive heating of any one portion of the tube. The burners are placed in the middle of the oven, with considerable distance between them and the longitudinal ends of the oven 16.

Figure 3:
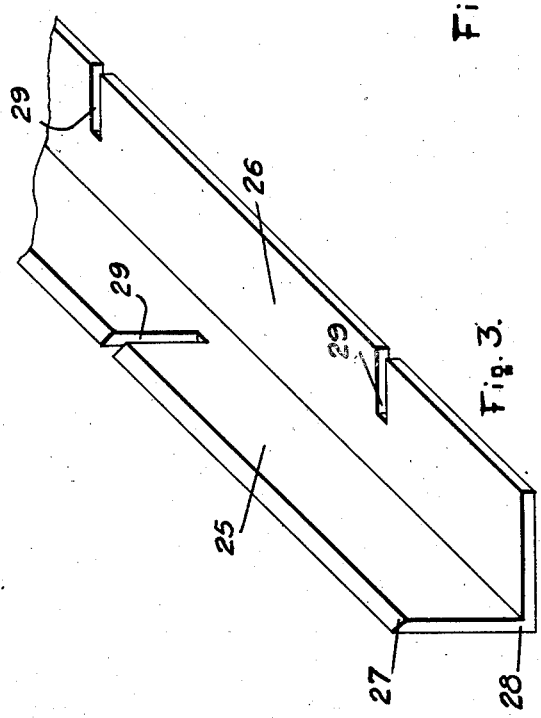
Fig. 3 is a profile view of the pushing device of Fig. 1.

The pushing fork 9, is shown in a more detailed profile view in Fig. 3. The design of this fork is very important, because of the excessive heat of the oven. The steel angle iron 28, has transverse slots 29, along its length. The slots on face 25, of the angle are staggered with respect to those on face 26. This permits the beveled edge 27, of the angle, which edge is the one which pushes against the tube 4 being baked and which thus comes in closest contact with the heat, to expand considerably without affecting the trueness of the angle itself. This is extremely important, since the pushing fork 9, moves in the very small space between the long rollers 5, and must remain true, despite the variable heat condition. Carbon steel has been found satisfactory for the forks 9; stainless steel is not as good.

Fig. 4 shows the longitudinal arrangement of the machine more in detail, except that the forks 9, which push the tubes 4, from roller to roller are, for simplicity, not shown. The legs 19 support the main body of the machine. The tubes 4 to be baked, are placed on the rollers 5, at end 1 of the machine, in some convenient manner, as by hand, for example. They are rotated by the rollers 5, and pushed along from one inter-roller space to the next, as explained in connection with Fig. 1. They pass through the oven 16, where they are gradually heated, eventually passing under the down-draft burners 22, and they being gradually cooled as they continue toward the exit end 2, of the oven, and roll onto the table 3, which may have the stop 28, at its lower end, to prevent their rolling off. The leg 19, may support the lower end of the table.

The burners 22, comprise the ceramic cups 50, which are the terminals of the gas mixture supply lines 17, which pass through the roof of the oven.

The exhaust boxes 35, at either end of the oven are connected to an exhaust system 36 to remove fumes and the like from the oven. The exhaust should be capable of regulation.

Fig. 5 shows a detail vertical cross-section through the machine, taken through one of the rollers 5. The oven side-walls 30, which form the support for the oven roof 32, are shown composed of the iron channel 37, covered on the oven-interior side by the stainless steel sheet 38. The oven roof is seen to comprise the iron channel beams 31. By comparison with Fig. 4, these iron channels will be seen to be placed with their open end facing downward into the oven, and with that open end covered by a reversed channel piece 39, of thin stainless steel. The stainless steel acts as a reflector to keep the heat in the oven, and the dead air space between the iron channel 31, and the stainless steel piece 39, acts as heat insulation. The same effect is also obtained, of course, in the side wall 30, which is similarly arranged. Over the iron channel pieces in the roof, however, is placed a layer of other insulation such as the magnesium bricks 58, 58. The bricks 58 in the neighborhood of the burners 22 are made small, or replaced by loose insulating material, to facilitate changing of the burners 22 when necessary for repairs.

The ducts 40, run along the outside of the oven, to discharge a current of air through the opening 50, onto the bearings 51 and 52, cooling them. These air ducts are connected to the air supply system 47. A current of air is admitted at the side of the oven through the open end 41 of the supply line 42, at a height such that the air passes through the tubes being baked. After passing through the tube, to oxidize the carbon which may be formed in the tube coating by the baking process, the air current is exhausted at the other side of the oven by the duct 43, which is connected to the exhaust system. These air inlets are necessary only at the middle of the oven, and are not used over the rollers at the ends of the oven.

The iron casting 44, supports the iron channel beam 37, from the channel 45, which acts as the bed for the machine.

The tubes are baked at about 450–490° C., generally, so the interior of the furnace is quite hot, and the metal rollers in the middle of the furnace will expand considerably, while those near the entrance and exit will expand less. The difference in expansion for the 53 inch rollers of stainless steel which I used, amounts to nearly ¾ of an inch. If no provision was made for it, the machine would be soon wrecked. Fig. 4 shows how I provide a smooth running roller despite expansion. The roller 5 comprises the hollow stainless steel tube 46, supported from the shaft 55, by the annular rings 48, 56, 57, spaced along its length. At one end, the shaft 55 fits into a fixed bearing 51 between collar 59 and collar 57; and at its other end the shaft fits through a bearing 52, through which it may slide axially on expansion. The lever 63, fixed to the fork 9, pivots on the same axis, being spaced from bearing 52 by spring 54, which takes up the expansion. A similar lever 61 at the other end of the fork is attached to the actuating arm 10, shown more clearly in Fig. 1. An actuating arm on each end of the fork may in some cases be helpful in preventing twisting of the fork. Bearing 51 is supported by a plate 62, attached over a cut-out portion of the angle-iron 45.

When the device is in operation, the shafts 46, in the middle of the furnace may extend out of the frame 26 an inch more than do those at the ends of the furnace, so great is the expansion. The annular ring 56 at one end of the steel roller 5 is fixed to the steel tubing 46 by pin 63, but the annular rings 49 and 57, inside the tubing, are not fixed to the latter, but allow it to slide along under its expansion. Pin 64 merely fixes the ring to the shaft. The annular ring should be staggered in position from rod to rod so that they will not all line up to produce uneven heating of the tube due to their effect.

In the same Fig. 5, the pushing fork 9, is shown with the staggered slots 29, described in connection with Fig. 3. The sprocket 7 is shown, as is the chain 8, operating the sprocket. The additional idler sprocket 56, may be used to keep the chain taut at its top and the chain may be left slack at the bottom of the sprocket, as indicated. The steel cover plates 65 and 66 may be used over the open end of the channels 45, if desired.

For convenience, the burners 22 are not shown in Fig. 5.

In operation, the coated tube 4, to be baked is placed on the rollers 5, at end 1, of the machine. The rollers 5, rotate the tube 4, insuring an even heating around its diameter, and every few seconds, the pushers 9, rise to push the tube over onto the next roller. The rollers themselves should rotate the tube in the direction it would rotate if rolled through the oven from the same end. As the tube progresses through the oven it passes under the burners 22, which are staggered so that the portion of a tube directly under a burner changes progressively as the tube passes through the furnace. Similarly, the annular supports 49, 56 inside the roller 5, are staggered in position from roller to roller, so that any hot or cold spot produced in the tube 4, by variation in support inside the roller will also move progressively along the tube 4, as the tube goes through the oven. In that way, an extremely uniform baking is obtained, with a consequent preservation of the original uniformity of the coated tube.

As the tube 4, progresses through the furnace, the coating inside the tube gradually assumes a dark, brownish or black color, due to decomposition of the binder to a carbon, or carbonaceous, residue. Near the center of the furnace, I place a few air inlets, in line with the positions, between rollers, occupied by the tubes 4, to insure the removal of this residue by oxidation. These inlets are important in a closed furnace such as we have used.

When the tube has passed through the furnace, it is pushed over the last roller, and rolls slowly down the inclined plane 3, and kept from rolling off by the stop 28.

If the machine is built to bake tubing of the size used in standard fluorescent lamps, say tubing of 1¼" diameter, then tubing of the types used in the luminous sign industry, of say 15 mm. diameter, will fall through the space between rollers. However, I find that if several pieces of such smaller tubing are placed inside a seamless steel tube of the larger diameter, say 1¼", the steel tube with the glass tubes inside, can be itself run through the furnace, and the smaller tubes inside it will be processed satisfactorily. If such a method is used, the steel tubing used as a container is preferably foraminous or perforated with a number of holes. The tubing baked in that manner will generally be found much straighter after processing than before, due to the annealing secured.

What I claim is:

1. A machine for baking internally-coated tubes of glass or the like, said machine comprising: an oven; a series of spaced refractory rollers along the bottom of said oven; a series of refractory forks, with each fork in the space between successive rollers; means for raising the forks; and a series of burners between the top of the oven and the rollers to direct heat downwardly toward the rollers.

2. The machine of claim 1, mechanism for rotating the rollers, and mechanism actuated by said first-mentioned mechanism, for raising the series of forks at recurrent intervals equal to the time of several revolutions of the rollers.

3. The machine of claim 1, and: mechanism for rotating the rollers; mechanism actuated by said first-mentioned mechanism, for raising the series of forks at recurrent intervals equal to the time of several revolutions of the rollers; and an air inlet at the middle of the oven, said inlet being set to direct air into one end of the tube being baked.

4. The machine of claim 1 and: mechanism for rotating the rollers; mechanism actuated by said first-mentioned mechanism, for raising the series of forks at recurrent intervals equal to the time of several revolutions of the rollers; and an air inlet at the middle of the oven, said inlet being set to direct air into one end of the tube being baked; and in which the forks are slotted angle-steel pieces.

5. The machine of claim 1 and: mechanism for rotating the rollers; mechanism actuated by said first-mentioned mechanism, for raising the series of forks at recurrent intervals equal to the time of several revolutions of the rollers; and an air inlet at the middle of the oven, said inlet being set to direct air into one end of the tube being baked; in which the oven comprises a frame of channel irons placed with the open ends of the channels facing the interior of the oven, and stainless sheet-steel channels covering the open ends of the channels, and in which the forks comprise slotted angle-steel pieces.

6. The machine of claim 1, and an air inlet at the middle of the oven, said inlet being set to direct air into one end of the tube being baked.

7. The machine of claim 1, in which the refractory forks are slotted angle-steel pieces.

8. The machine of claim 1, in which the oven comprises a frame of channel irons placed with the open ends of the channels facing the interior of said oven and stainless steel channels covering the open ends of the iron channels.

ROLAND M. GARDNER.